United States Patent [19]

Brems

[11] 4,018,090
[45] Apr. 19, 1977

[54] ROTARY AND LINEAR REVERSIBLE INDEXING MECHANISM

[76] Inventor: John Henry Brems, 32867 White Oaks Trail, Birmingham, Mich. 48010

[22] Filed: May 15, 1975

[21] Appl. No.: 577,943

[52] U.S. Cl. .................................................. 74/52
[51] Int. Cl.² ........................................ F16H 37/12
[58] Field of Search .............................. 74/52, 600

[56] References Cited

UNITED STATES PATENTS

| | | | |
|---|---|---|---|
| 2,188,060 | 1/1940 | Robins | 74/600 |
| 2,567,974 | 9/1951 | Scott | 74/600 |
| 3,282,218 | 11/1966 | Bauers | 74/600 |

OTHER PUBLICATIONS

Chironis–Machine Devices & Instrumentation, Circa. 1966–pp. 121, 122.

*Primary Examiner*—Samuel Scott
*Assistant Examiner*—Wesley S. Ratliff, Jr.
*Attorney, Agent, or Firm*—Barnes, Kisselle, Raisch & Choate

[57] ABSTRACT

An intermittent reversible indexing system with a rotary input and rotary output which includes a natural dwell of the output at the end of each cycle with a smooth acceleration to a maximum velocity and subsequent deceleration to another dwell and a simple mechanism for changing the index stroke. A planetary carrier carrying a single planetary gear is driven about a first axis with the planetary gear in mesh with a stationary sun gear concentric about said first axis. A drive member in the form of a shaft eccentric to the axis of said planetary engages and slides in a slot of an output member, thereby driving said output member about a second axis displaced from said first axis. A movable mount for the output member changes the drive relationship with said eccentric shaft to change the index motion.

8 Claims, 13 Drawing Figures

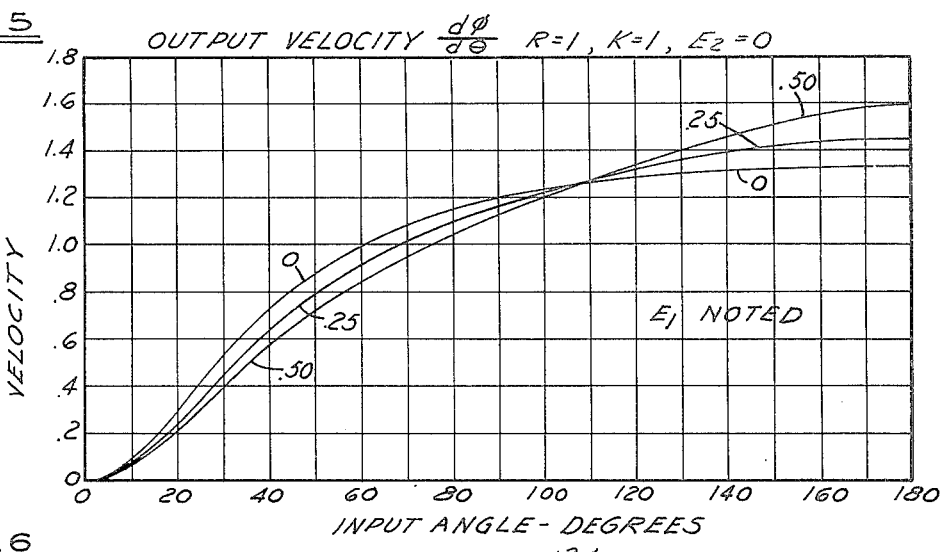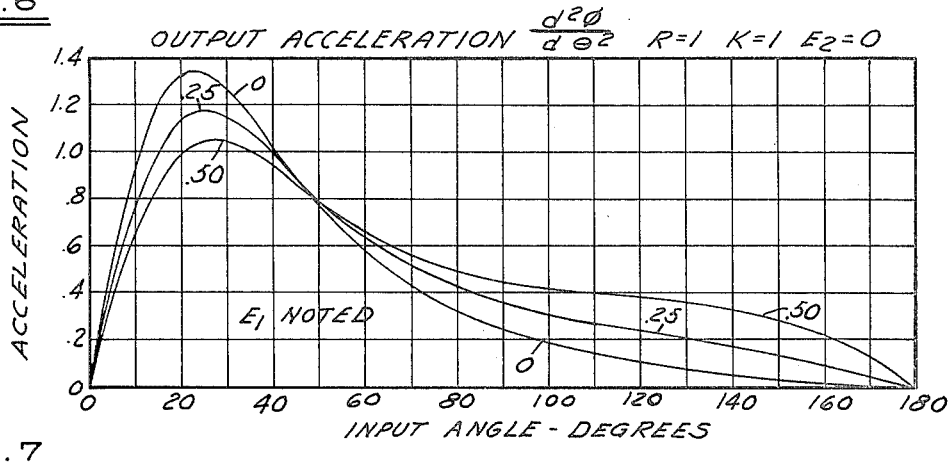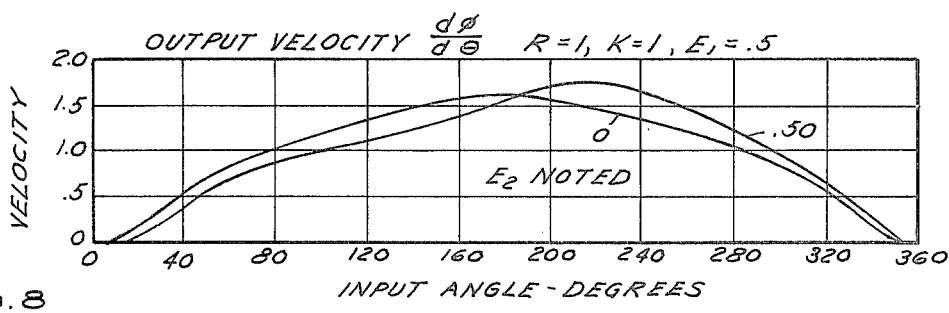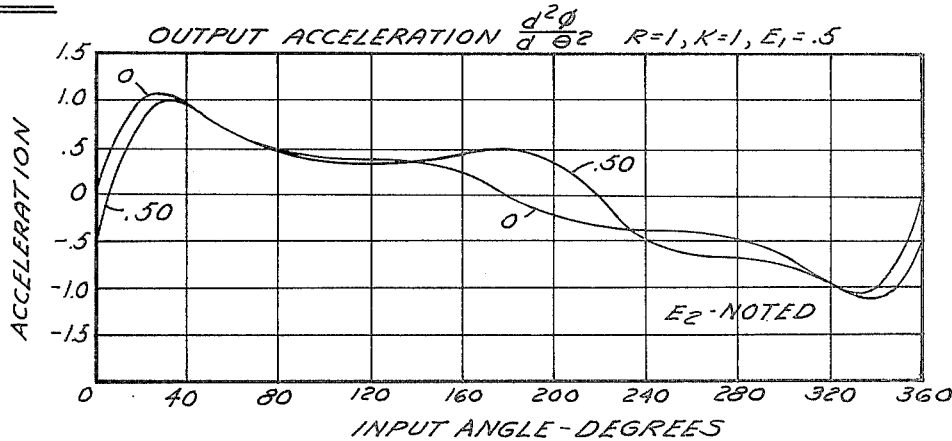

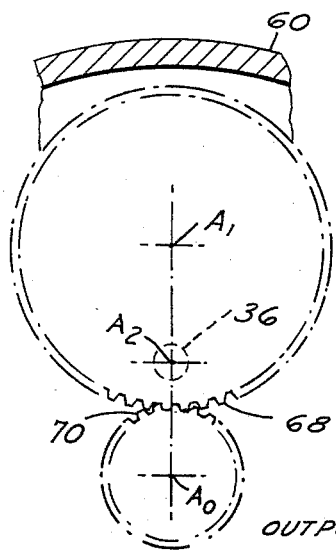
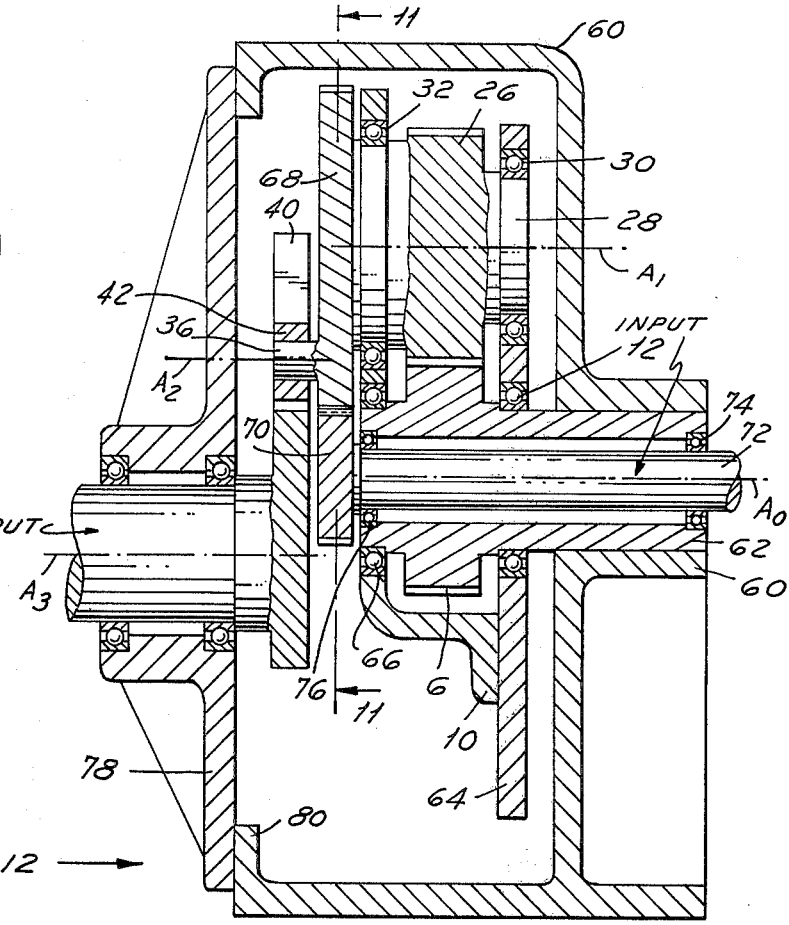
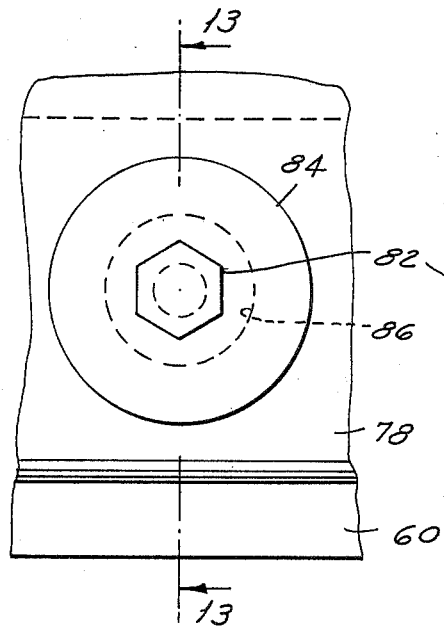
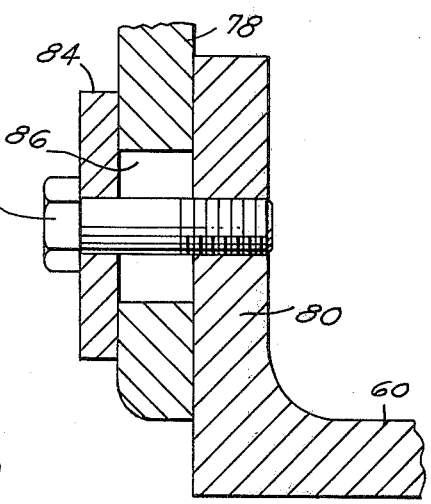

ROTARY AND LINEAR REVERSIBLE INDEXING MECHANISM

This invention relates to a Rotary and Linear Reversible Indexing Mechanism.

It is an object of this invention to provide a mechanism which has a wide range of kinematic flexibility.

It is a further object of this invention to provide a mechanism which can inherently provide a small but useful change in index stroke.

It is a further object of this invention to provide a mechanism in which the internal mechanical advantages of the mechanism are favorable over the entire indexing stroke.

It is a further object of this invention to provide a mechanism which includes a natural stop or dwell of the output at each end of cycle with a smooth acceleration to a maximum velocity and subsequent deceleration to another dwell.

Other objects and features of the invention relating to details of construction and operation will be apparent in the following description and claims in which the principles of operation and use of the invention are set forth in connection with the best mode presently contemplated for practice of the invention.

Figure 1:
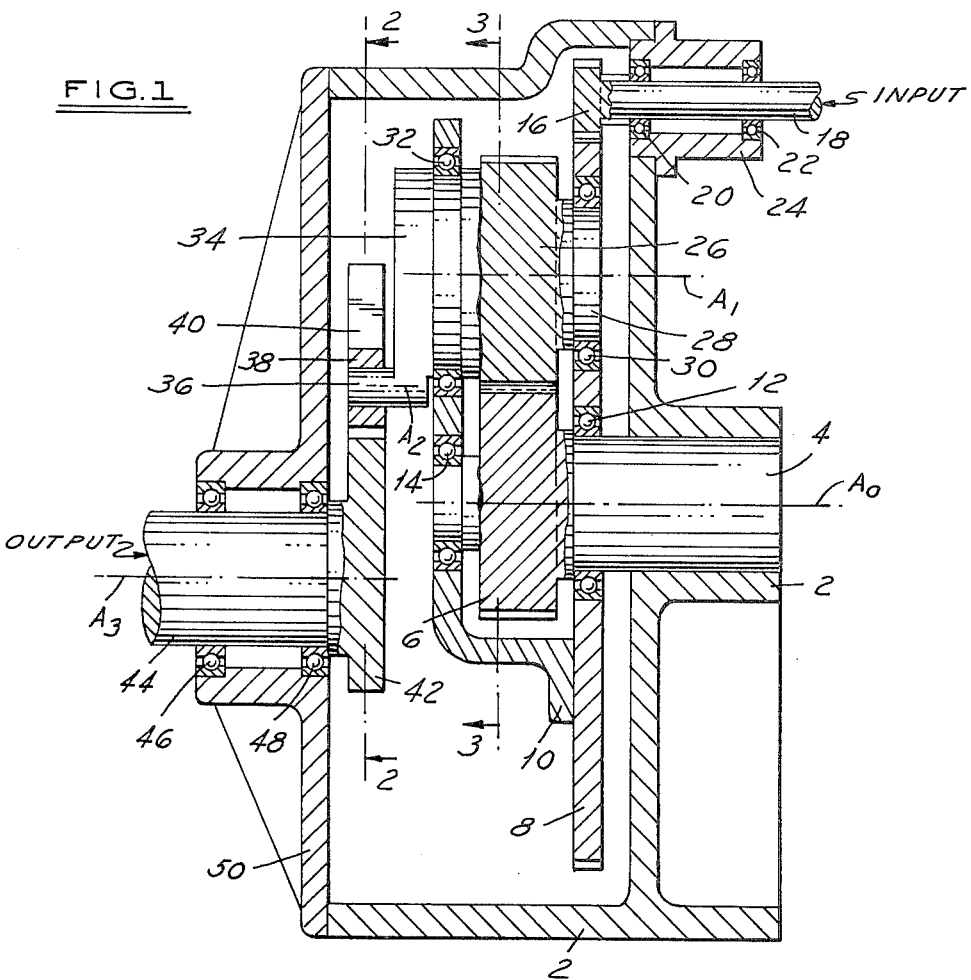

Drawings accompany the disclosure and the various views thereof may be briefly described as:

FIG. 1, a longitudinal section through a typical embodiment of the invention.

Figure 2:
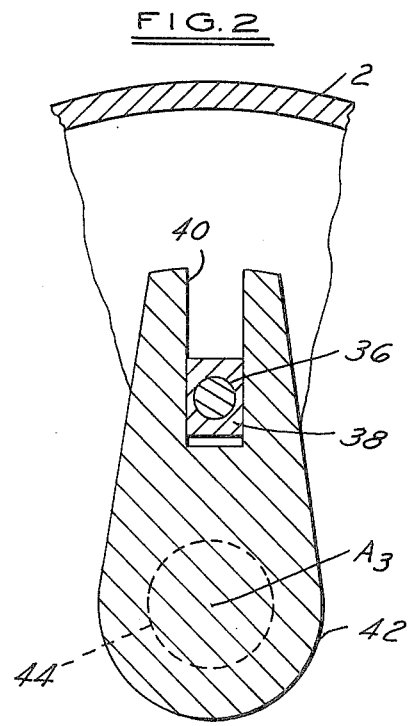

FIG. 2, a transverse section taken on line 2—2 of FIG. 1.

Figure 3:
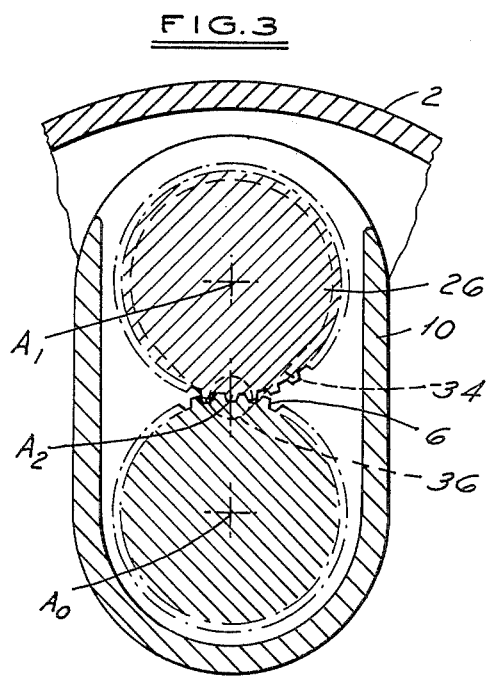

FIG. 3, a transverse section taken on line 3—3 of FIG. 1.

Figure 4:
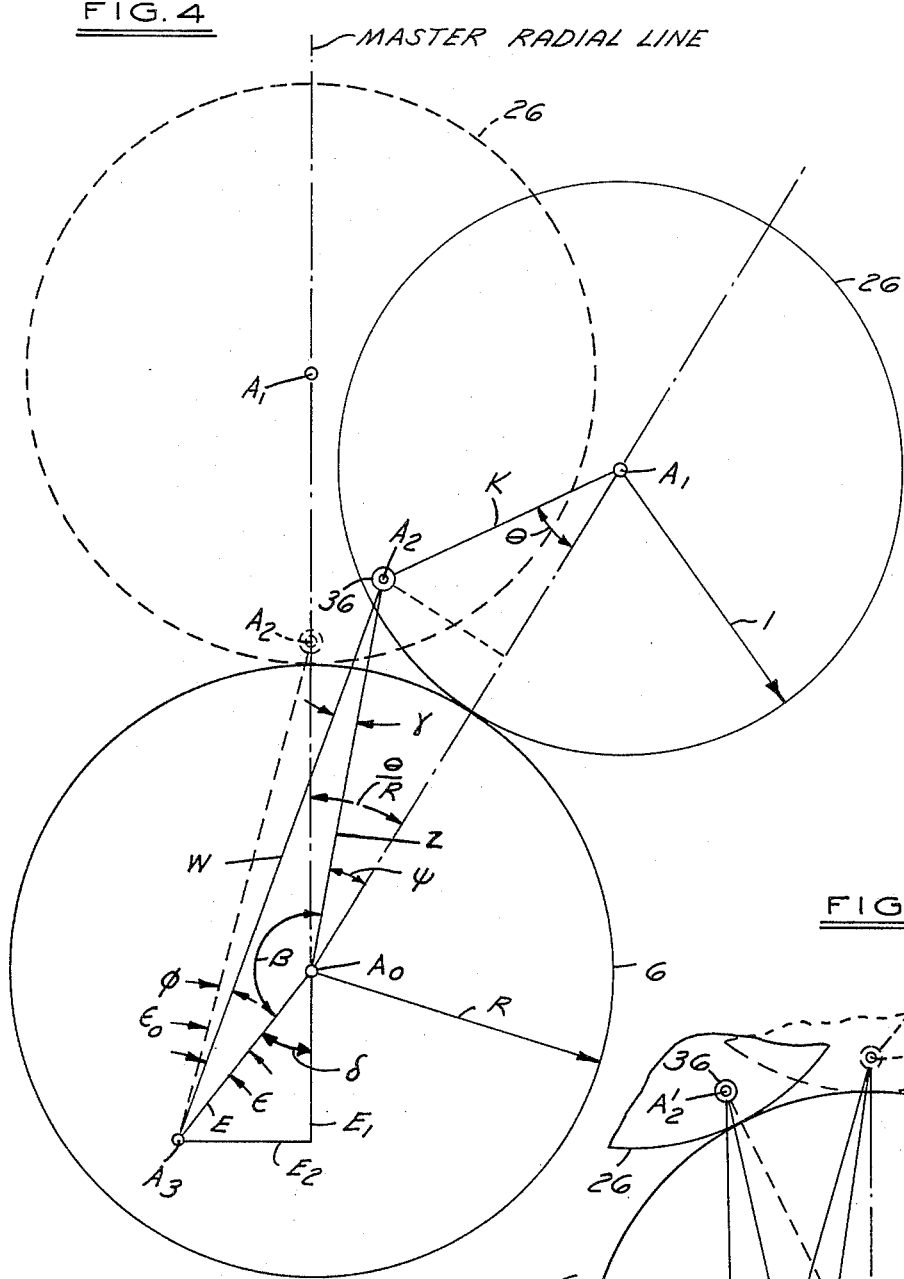

FIG. 4, a schematic line kinematic drawing for defining parameters and variables.

FIG. 5, a series of curves showing the output velocity as a function of input angle for an illustrative set of parameters.

FIG. 6, a series of curves showing the output acceleration as a function of input angle for the same set of illustrative parameters as used in FIG. 5.

FIG. 7, a series of curves showing the output velocity as a function of input angle for a second set of illustrative parameters.

FIG. 8, a series of curves showing the output acceleration as a function of input angle for the same set of illustrative parameters as used in FIG. 7.

Figure 9:
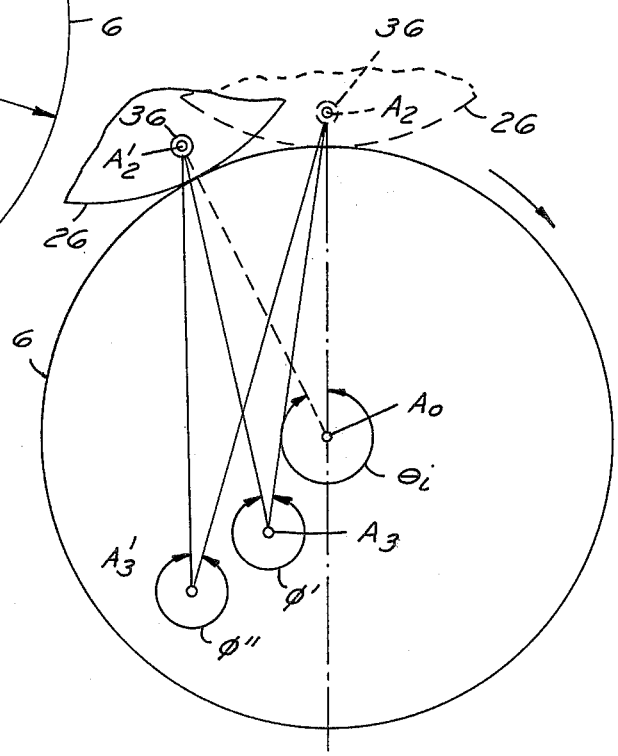

FIG. 9, a schematic line drawing illustrating the change of output angle with a shift of offset of the output axis.

FIG. 10, a longitudinal section through an alternate embodiment of the invention.

FIG. 11, a transverse section taken on line 11—11 of FIG. 10.

FIG. 12, an enlarged detail view showing fastening means for a cover plate shown in FIG. 11.

FIG. 13, a transverse section taken on line 13—13 of FIG. 12.

REFERRING to FIGURES 1, 2 and 3, a case 2 supports a stationary shaft 4 on which in turn is mounted a stationary sun gear 6. A planetary carrier assembly is made up of a plate 8 and a housing 10 bolted thereto. This planetary carrier 8, 10 is mounted to the stationary shaft 4 through bearings 12 and 14 and rotates about the axis $A_o$. The periphery of the plate 8 is formed into a gear suitable for meshing with an input gear 16 mounted on a shaft 18 which rotates in bearings 20 and 22 mounted in a housing 24 bolted to the case 2.

The shaft 18 is rotated by some external drive source such as a reversible electric motor and gear reducer with a suitable brake (not shown) to be utilized at the end of the stroke. Rotation of the shaft 18 causes the planetary carrier 8, 10 to rotate about the fixed axis $A_o$.

A planetary gear 26 suitably formed to mesh with the sun gear 6 is mounted on a planetary shaft 28 which in turn is mounted to the planetary carrier 8, 10 through bearings 30 and 32. The planetary gear 26 rotates on the moving axis $A_1$ as the planetary carrier 8, 10 rotates about axis $A_o$.

An eccentric support plate 34 is mounted to the planetary shaft 28 and has projecting therefrom an eccentric shaft 36 on an axis $A_2$ displaced from the axis $A_1$. A slide block 38 is rotatably mounted on the eccentric shaft 36; this slide block 38 in turn is slidably movable in a slot 40 of an output spider 42 (FIG. 2). This output spider 42 is mounted on an output shaft 44 which rotates in bearings 46 and 48 mounted in a case cover 50 fastened by bolts (not shown) to the case 2. The shaft 44 and output spider 42 rotate about an axis $A_3$ displaced from the primary axis $A_o$.

There are a variety of kinematic and mechanical benefits which accrue from the displacement of the output axis $A_3$ from the primary axis $A_o$ as will be evident from the kinematic analysis below. It can be seen that as the planetary carrier 8, 10 rotates about the axis $A_o$ and the planetary shaft 28 is driven about the moving axis $A_1$, the eccentric shaft 36 and its axis $A_2$ move in an epitrochoidal or epicycloidal path, depending on the amount of displacement of the axis $A_2$ from the axis $A_1$. Provided only that the axis $A_3$ lies within the path of the axis $A_2$, the eccentric shaft 36 and slide block 38 cause the output spider 42 and output shaft 44 to rotate about the axis $A_3$.

Referring to the schematic kinematic diagram shown in FIG. 4, the following quantities will be defined:

$\theta$ = input angle having a range of 0°–360° per cycle
$R$ = pitch radius of sun gear 6
$\phi$ = output angle of the output spider 42 per cycle which has a range of $0 - (360/R)$
$K$ = distance from axis $A_1$ to axis $A_2$ The pitch radius of the planetary gear 26 is arbitrarily defined as 1 unit and the master radial line is defined as that radial line extending from the center of the sun gear 6, axis $A_o$, to the center of the planet gear 26, axis $A_1$, with the planet gear 26 so positioned that the center of eccentric shaft 36, axis $A_2$, lies on the master radial line. The dashed outline of the shaft 36 in FIG. 3 shows the axis $A_2$ on the master radial line.

The total distance or offset between the input axis $A_o$ and the output axis $A_3$ is defined as E and makes an angle $\delta$ to the master radial line. The total offset E may be broken down into two components: $E_1$ which is parallel to the master radial line; and $E_2$ which is perpendicular to the master radial line.

After the planet 26 has rotated through an angle $\theta$ with respect to the centerline from $A_1$ to $A_o$, the position shown by the solid planet gear 26 outline in FIG. 4 is reached. It can be seen that:

$$\psi = \tan^{-1}\left(\frac{K \sin\theta}{R + 1 - K \cos\theta}\right) \quad (1)$$

and $$Z = \sqrt{(K\sin\theta)^2 + (R + 1 - K\cos\theta)^2} \quad (2)$$

By summing angles about $A_o$:

$$\beta = 180° - \delta + \frac{\theta}{R} - \psi \quad (3)$$

By using the Cosine Law:

$$W = \sqrt{E^2 + Z^2 - 2EZ\cos\beta} \quad (4)$$

By again using the Cosine Law:

$$\gamma = \cos^{-1}\left(\frac{W^2 + Z^2 - E^2}{2WZ}\right) \quad (5)$$

By summing interior angles in triangle $A_o$ $A_2$ $A_3$:

$$\epsilon = 180° - \delta - \beta \quad (6)$$

It can be seen that the value of $\epsilon$ when $\theta$ is 0 defined as $\epsilon_o$ is:

$$\epsilon_o = \tan^{-1}\left(\frac{R + 1 + E_1 - K}{E_2}\right) - \tan^{-1}\left(\frac{E_1}{E_2}\right) \quad (7)$$

And by summing angles about $A_3$:

$$\phi = \epsilon_o - \epsilon \quad (8)$$

It can be seen that a definite functional relationship exists between the output angle $\phi$ and the input angle $\theta$; that is, for every value of the angle $\theta$ there exists a calculable value of the angle $\phi$ and therefore $$\phi = f(\theta)$$

To express this functional relationship explicitly is laborious and complex; to subsequently differentiate such an explicit expression to obtain velocity by the methods of classical calculus and then to differentiate again to obtain acceleration again by the methods of classical calculus is exceedingly complex.

The solutions may be obtained with relative ease by numerical methods using a programmable calculator or computer. For each value of $\theta$, it is possible to calculate a value of $\phi$ using the equations 1–8, with R, K, $E_1$ and $E_2$ as parameters. First and second derivatives may be obtained using standard numerical techniques.

Using such numerical methods, the graphs of the kinematic characteristics shown in FIGS. 5, 6, 7 and 8 were obtained. FIGS. 5 and 6 represent the kinematic behavior of a system in which the radius R of the sun gear 6 is set equal to 1; therefore, the sun gear 6 and the planetary gear 26 are equal in size, and a given index cycle consists of a 360° output movement of the output spider 42 and an input movement of 360° of the planetary carrier 8, 10. The centerline $A_2$ of the eccentric shaft 36 lies on the pitch line of the planetary gear 26 and the value of K is therefore 1.

The velocity of the output relative to the velocity of the input, $d\phi/d\theta$, for three different values of $E_1$, with $E_2 = 0$, is shown in FIG. 5. Because of obvious symmetry when $E_2 = 0$, the curves are only plotted for a 180° input span. It will be noted that for all three values of E, the velocity of the output reaches a value of 0 when the input angle is 0° and reaches a maximum value when the input angle is 180°. Therefore, for a constant input rotation angular velocity, the output will stop or dwell once during each cycle.

The acceleration of the output relative to the input, $d^2\phi/d\theta^2$, for the same $E_1$ parameters as FIG. 5 are shown in FIG. 6. It will be noted that the acceleration reaches 0 at input angles of 0° and 180°. It is evident from FIGS. 5 and 6 that it is possible to modify both the velocity and acceleration characteristics of the indexing system to a significant degree by controlling the magnitude of $E_1$ alone while $E_2$ is 0.

When $E_2$ has a value other than 0, such symmetry no longer exists; this is illustrated in FIGS. 7 and 8. For these figures, $R = 1$ and $K = 1$ as for FIGS. 5 and 6 and $E_1 = 0.5$ for all curves which are now presented for the full 360° input span. In FIGS. 7 and 8, the curves marked O ($E_2 = 0$) are identical with the curves $E_1 = 0.5$ in FIGS. 5 and 6. When $E_2$ is 0.5 a significant alteration in the velocity and acceleration characteristics will be noted.

The kinematic behavior of the system for an illustrative set of parameters is shown by the curves of FIGS. 5–8. It will be understood that these are sample characteristics only. By a judicious and knowledgeable choice of the governing parameters R, K, $E_1$ and $E_2$, one of a wide variety of specific mechanisms may be designed to suit a given application requirement.

FIG. 9 shows another important practical attribute of having the output axis $A_3$ noncoincident with the input axis $A_o$, which is that the output index angle may be varied over a small but useful range by a small adjustment in the offset or distance between the input axis $A_o$ and the output axis $A_3$.

Referring to FIG. 9, the planet gear 26 is shown in two positions: a first or starting position shown in dotted lines; and a second or stopping position shown in solid lines after the planet gear 26 has rotated through one revolution clockwise about its own moving axis, causing slightly less than 360° clockwise movement about the sun gear 6. It is obvious that to achieve this situation, the radius of the sun gear 6 is slightly larger than the radius of the planet gear 26. It will also be seen that to achieve this movement of the planetary gear 26, the planetary carrier 8–10 rotates clockwise about axis $A_o$ through an angle $\theta$ as shown in FIG. 9.

If the output axis is at some position as shown by $A_3$, it can be seen that the total output index movement is shown by the angle $\phi'$; if the output axis is now moved to some new position $A_3'$, the total output index movement is shown by the angle $\phi''$, where angle $\phi''$ is different from angle $\phi'$.

Therefore, it may be stated that for applications in which the planet gear 26 pitch radius is not an integral multiple of the sun gear 6 pitch radius, the output index angle may be varied through an adjustment of the distance between the input axis $A_o$ and the output axis $A_3$.

Practically such an adjustment movement may be easily attained by oversize or slotted holes in the fastening of the case cover 50 to the case 2 as shown in FIGS. 1 and 2. See FIGS. 12 and 13.

This characteristic is of particular value when the subject mechanism is used to drive a gear rack combination to accomplish a linear reciprocating indexing motion, and it is necessary to adjust the magnitude of the stroke to the precise needs of the application or to compensate for wear.

The embodiment shown in FIGS. 10 and 11 retains all of the essential elements of the invention but shows a different method of supplying the input power; it also illustrates one of a variety of ways of making the output axis adjustable with respect to the remainder of the mechanism.

Referring to FIGS. 11 and 12, the case 60 supports a stationary tubular shaft 52 on which is again mounted the stationary sun gear 6. A planetary carrier assembly is made up of a plate 64 and the housing 10 bolted thereto (bolts not shown) rotating about axis $A_o$ and shaft 62 on bearings 12 and 66. It will be noted that there are no longer gear teeth on the periphery of the plate 64, and the previously shown input gear assembly has been eliminated.

The planetary gear 26 suitably formed to mesh with the sun gear 6 is again mounted on the planetary shaft 28, mounted to the planetary carrier 64, 10 through bearings 30 and 32. The planetary gear 26 rotates about the moving axis $A_1$ as the planetary carrier 64, 10 rotates about axis $A_o$.

A cluster gear 68 is mounted on the planetary shaft 28 concentric with gear 68 and also rotates on the moving axis $A_1$. An input gear 70 is suitably formed to mesh with the gear 68; the gear 70 is mounted on the input shaft 72 and both rotate on the axis $A_o$ in bearings 74 and 76 mounted in the shaft 62. Input power is supplied to shaft 72 by some external reversible power source. As the gear 70 rotates about axis $A_o$, it drives gear 68 about axis $A_1$ causing gear 26 to move about the stationary sun gear 6. It will be noted that this is merely a different method of applying the input power as compared to the embodiment of FIGS. 1, 2 and 3.

The eccentric shaft 36 is mounted on the gear 68 and is again concentric about an axis $A_2$ displaced from axis $A_1$. The remainder of the output system is substantially identical with that of FIGS. 1, 2 and 3.

The case cover 78 is modified to clearly show an illustrative method of providing adjustment means between the case 60 and case cover 78, thereby making axis $A_3$ adjustable with respect to axis $A_o$. The case 60 is formed into a broad flange 80 at the interface with the case cover 78 which is fastened to it by a series of bolts 82, one of which is shown in FIGS. 12 and 13. Each bolt 82 clamps the case cover 78 to the case flange 80 through a thick oversize washer 84. Each mating hole 86 in the case cover 78 is significantly oversize relative to the bolt 82 to permit a significant movement of the case cover 78 with respect to the case 60. To accomplish an adjustment, all bolts 82 are loosened, the case cover 78 shifted to the desired new position, and all bolts 82 then retightened.

It will be understood that this system is illustrative only and that any of a wide variety of common adjustment systems could be utilized. It will be further understood that this illustrated adjustment system, or any other is equally adaptable to the embodiment of FIGS. 1, 2 and 3. As indicated the mechanism is reversible, this being accomplished by a reversible power input.

I claim:

1. An intermittent reversible indexing system having a rotary input and a rotary output, with variable kinematic characteristics comprising:
   a. a frame,
   b. a circular reaction member mounted in said frame and concentric about a first axis,
   c. a first rotating member mounted for rotation in said frame and rotating about said first axis,
   d. a second rotating member of different diameter than said circular reaction member mounted for rotation on said first rotating member and rotating about a second axis displaced from said first axis and adapted for tangential driving engagement with said circular reaction member,
   e. an eccentric member mounted on said second rotating member concentric about a third axis displaced from said second axis,
   f. an output member mounted for rotation in said frame and rotating about a fourth axis displaced from said first axis and in driven engagement with said eccentric member, and
   g. input power means driving one of said rotating members.

2. An intermittent reversible indexing system having a rotary input and a rotary output, with variable kinematic characteristics comprising:
   a. a frame,
   b. a reaction gear member mounted in said frame and concentric about a first axis,
   c. a planetary carrier member mounted for rotation in said frame and rotating about said first axis,
   d. a planetary gear member of different diameter than said reaction gear member mounted for rotation in said planetary carrier member and rotating about a planetary axis displaced from said first axis and adapted for driving engagement with said reaction gear member,
   e. an eccentric shaft member mounted on said planetary gear member concentric about a third axis displaced from said planetary axis,
   f. an output member mounted for rotation in said frame and rotating about a fourth axis displaced from said first axis and in driven engagement with said eccentric shaft member, and
   g. input power means driving said planetary carrier member about said first axis.

3. An intermittent reversible indexing system having a rotary input and a rotary output with variable kinematic characteristics comprising:
   a. a frame,
   b. a reaction gear member mounted in said frame and concentric about a first axis,
   c. a planetary carrier member mounted for rotation in said frame and rotating about said first axis,
   d. a planetary gear member mounted for rotation in said planetary carrier member and rotating about a planetary axis displaced from said first axis and adapted for driving engagement with said reaction gear member,
   e. a cluster gear member mounted on said planetary gear member and rotating about said planetary axis,
   f. an eccentric shaft member mounted on said cluster gear member concentric about a third axis displaced from said planetary axis,
   g. an output member mounted for rotation in said frame and rotating about a fourth axis displaced from said first axis and in driven engagement with said eccentric shaft member,
   h. an input gear mounted for rotation about said first axis and in tangential driving engagement with said cluster gear, and
   i. input power means to drive said input gear about said first axis.

4.

An intermittent reversible indexing system having a rotary input and a rotary output, with variable kinematic characteristics comprising:
   a. a first frame member,
   b. a second frame member adjustably mounted to said first frame member,
   c. a circular reaction member mounted on said first frame member and concentric about a first axis,
   d. a first rotating member mounted for rotation in said first frame member and rotating about said first axis,
   e. a second rotating member of different diameter than said circular reaction member mounted for rotation on said first rotating member and rotating about a second axis displaced from said first axis and adapted for tangential driving engagement with said circular reaction member,
   f. an eccentric member mounted on said second rotating member concentric about a third axis displaced from said second axis,
   g. an output member mounted for rotation in said second frame member and rotating about a fourth axis displaced from said first axis and in driven engagement with said eccentric member, and
   h. input power means driving one of said rotating members.

5. An indexing system as defined in claim 4 in which a fastening means operably associates said first frame member and said second frame member to retain said frame members in engagement in the direction of said axes, and means formed on one of said frame members to permit radial motion of said fastening means to accommodate radial shifting of said frame members relative to each other and a corresponding change in the separation of said third and fourth axes.

6. An intermittent reversible indexing system having a rotary input and a rotary output with variable kinematic characteristics comprising:
   a. a first frame member,
   b. a second frame member adjustably mounted on said first frame member,
   c. a reaction gear member mounted in said first frame member and concentric about a first axis,
   a planetary carrier member mounted for rotation in said first frame member and rotating about said first axis,
   e. a planetary gear member of different diameter than said reaction gear member mounted for rotation in said planetary carrier member and rotating about a planetary axis displaced from said first axis and adapted for driving engagement with said reaction gear member,
   f. an eccentric shaft member mounted on said planetary gear member concentric about a third axis displaced from said planetary axis,
   g. an output member mounted for rotation in said second frame member and rotating about a fourth axis displaced from said first axis and in driven engagement with said eccentric shaft member, and
   h. input power means driving one of said rotating members.

7. An intermittent reversible indexing system having a rotary input and a rotary output with variable kinematic characteristics comprising:
   a. a first frame member,
   b. a second frame member adjustably mounted to said first frame member,
   c. a reaction gear member mounted in said first frame member and concentric about a first axis,
   d. a planetary carrier member mounted for rotation in said first frame member and rotating about said first axes,
   e. a planetary gear member mounted for rotation in said planetary carrier member and rotating about a planetary axis displaced from said first axis and adapted for driving engagement with said reaction gear member,
   f. a cluster gear member mounted on said planetary gear member and rotating about said planetary axis,
   g. an eccentric shaft member mounted on said cluster gear member concentric about a third axis displaced from said planetary axis,
   h. an output member mounted for rotation in said second frame member and rotating about a fourth axis displaced from said first axis and in driven engagement with said eccentric shaft member,
   i. an input gear mounted for rotation about said first axis and in tangential driving engagement with said cluster gear, and
   j. input power means to drive said input gear about said first axis.

8. An intermittent reversible indexing system having a rotary input and a rotary output, with variable kinematic characteristics comprising:
   a. frame,
   b. a circular reaction member mounted in said frame and concentric about a first axis,
   c. a first rotating member mounted for rotation in said frame and rotating about said first axis,
   d. a second rotating member of different diameter than said circular reaction member mounted for rotation on said first rotating member and rotating about a second axis displaced from said first axis and adapted for tangential driving engagement with said circular reaction member,
   e. an eccentric member mounted on said second rotating member concentric about a third axis displaced from said second axis,
   f. an output member mounted for rotation in said frame and rotating about a fourth axis displaced from said first axis and in driven engagement with said eccentric member,
   g. input power means driving one of said rotating members,
   h. said eccentric member comprising a shaft projecting from said second rotating member in a direction parallel to the axis of said output member, and
   i. said output member having a radial slot receiving said shaft in a sliding relationship wherein during the driving of said output member by said shaft there is a radial sliding movement of said shaft in said slot.

* * * * *